March 29, 1927.
J. R. KELLEY
1,622,320
RADIOGRAPHIC APPARATUS
Filed Oct. 16, 1925
9 Sheets-Sheet 1
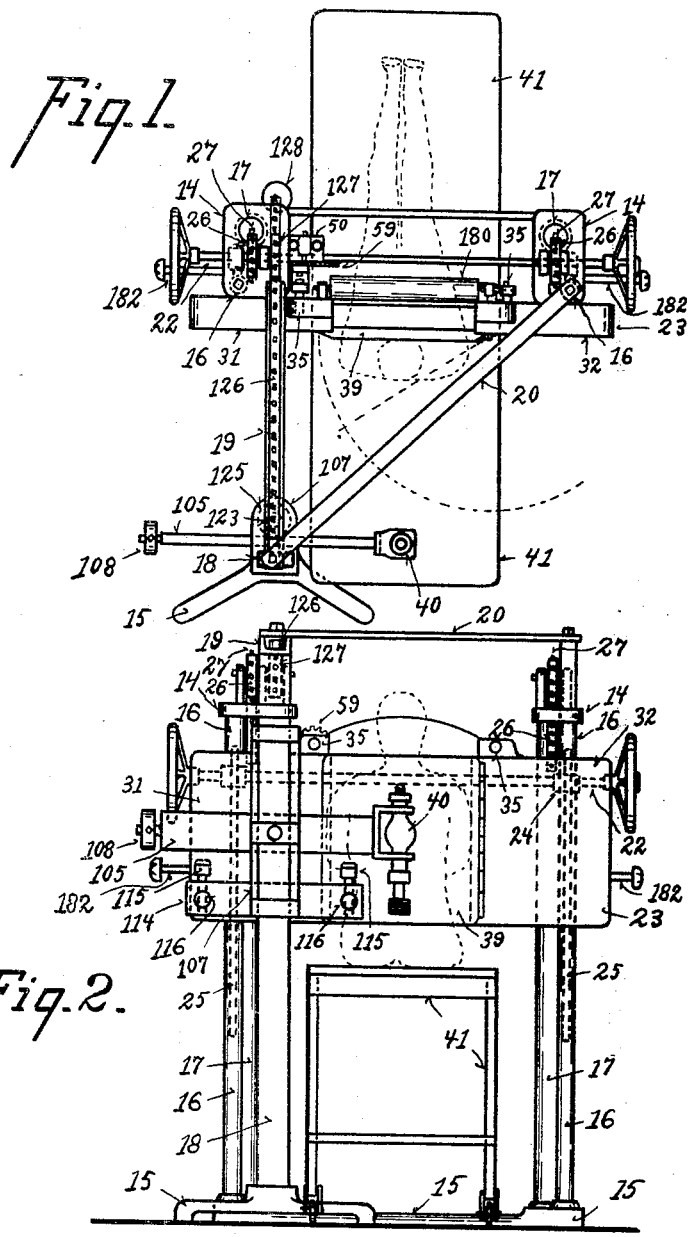
Inventor,
John Robert Kelley
By C. W. Miles,
Attorney.

March 29, 1927.
J. R. KELLEY
1,622,320
RADIOGRAPHIC APPARATUS
Filed Oct. 16, 1925
9 Sheets-Sheet 2
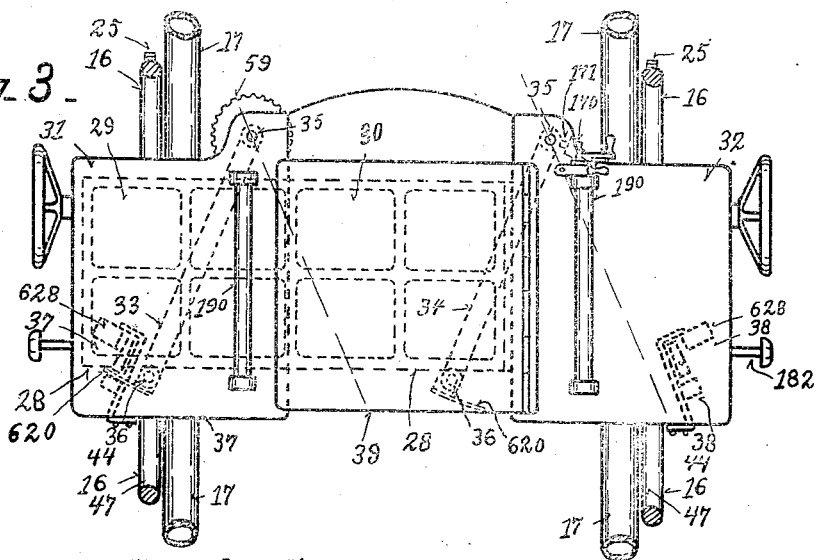
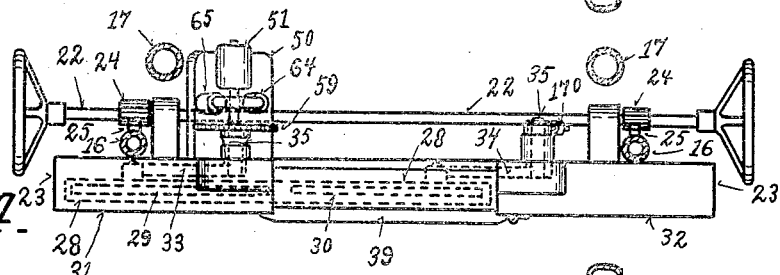
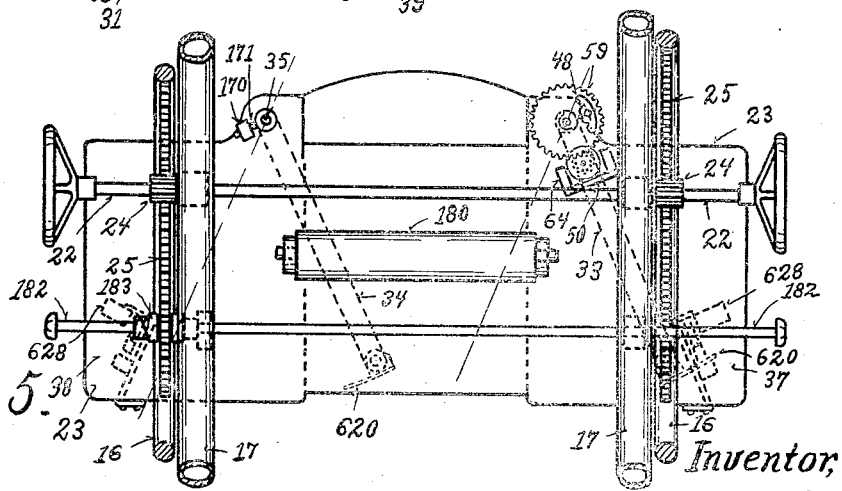
Inventor,
John Robert Kelley,
By C. W. Miles.
Attorney.

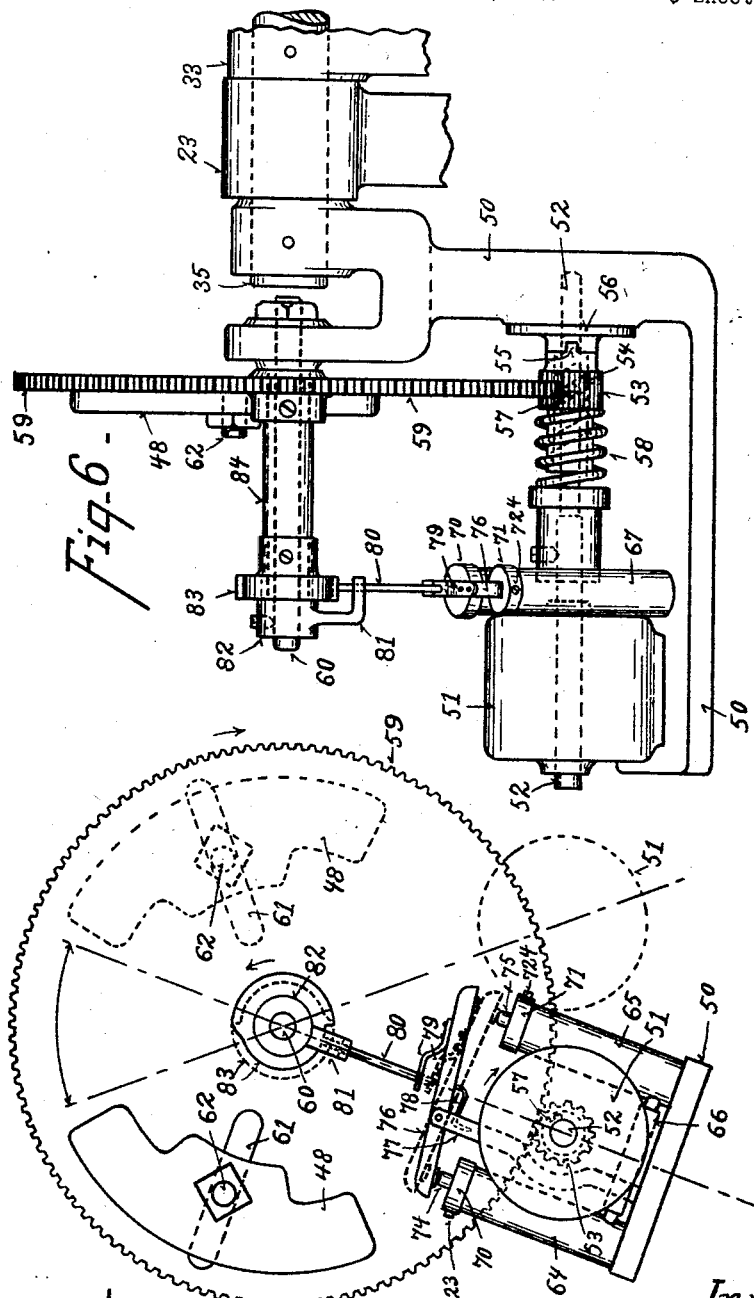

March 29, 1927.
J. R. KELLEY
1,622,320
RADIOGRAPHIC APPARATUS
Filed Oct. 16, 1925
9 Sheets-Sheet 4
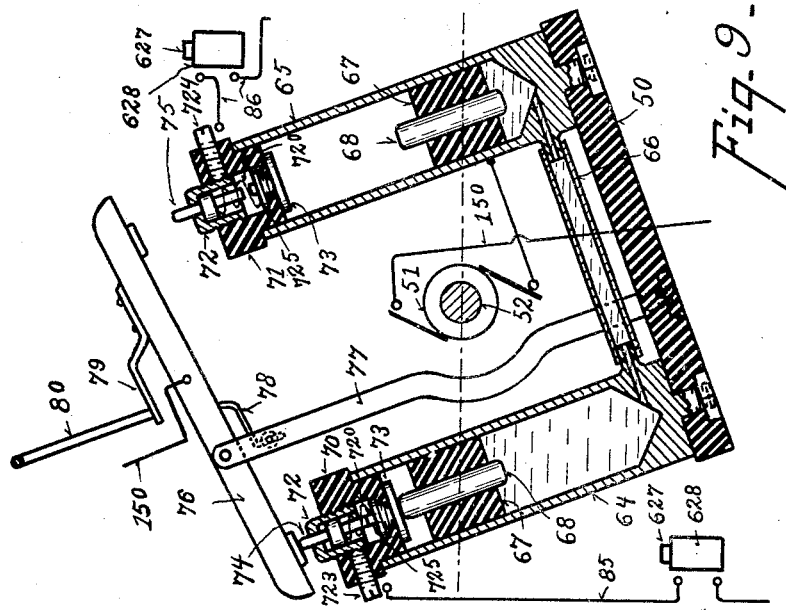
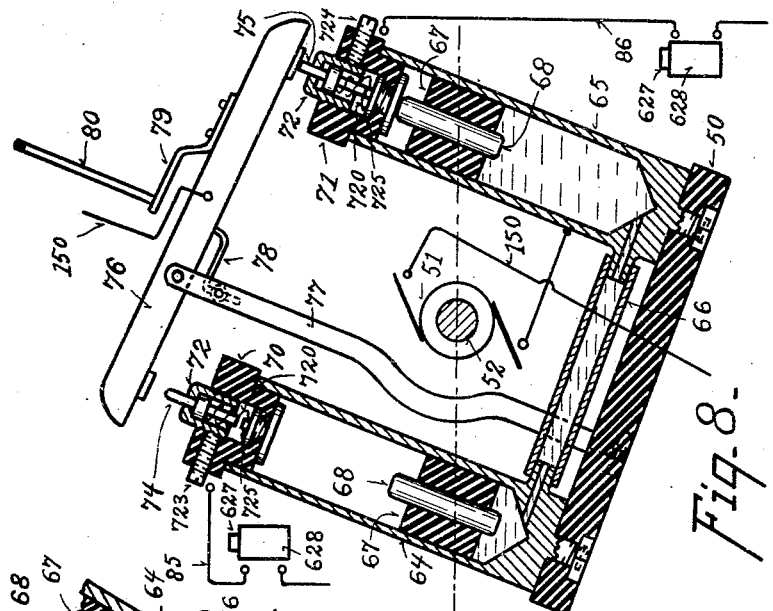
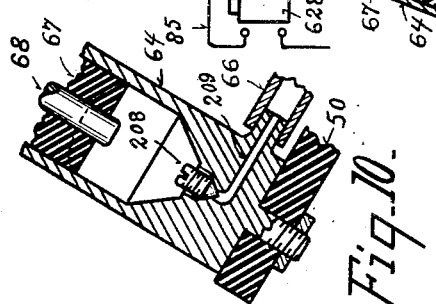
Inventor,
John Robert Kelley,
By C. W. Miles,
Attorney.

March 29, 1927.

J. R. KELLEY

RADIOGRAPHIC APPARATUS

Filed Oct. 16, 1925

Inventor,
John Robert Kelley,
By C. W. Miles,
Attorney.

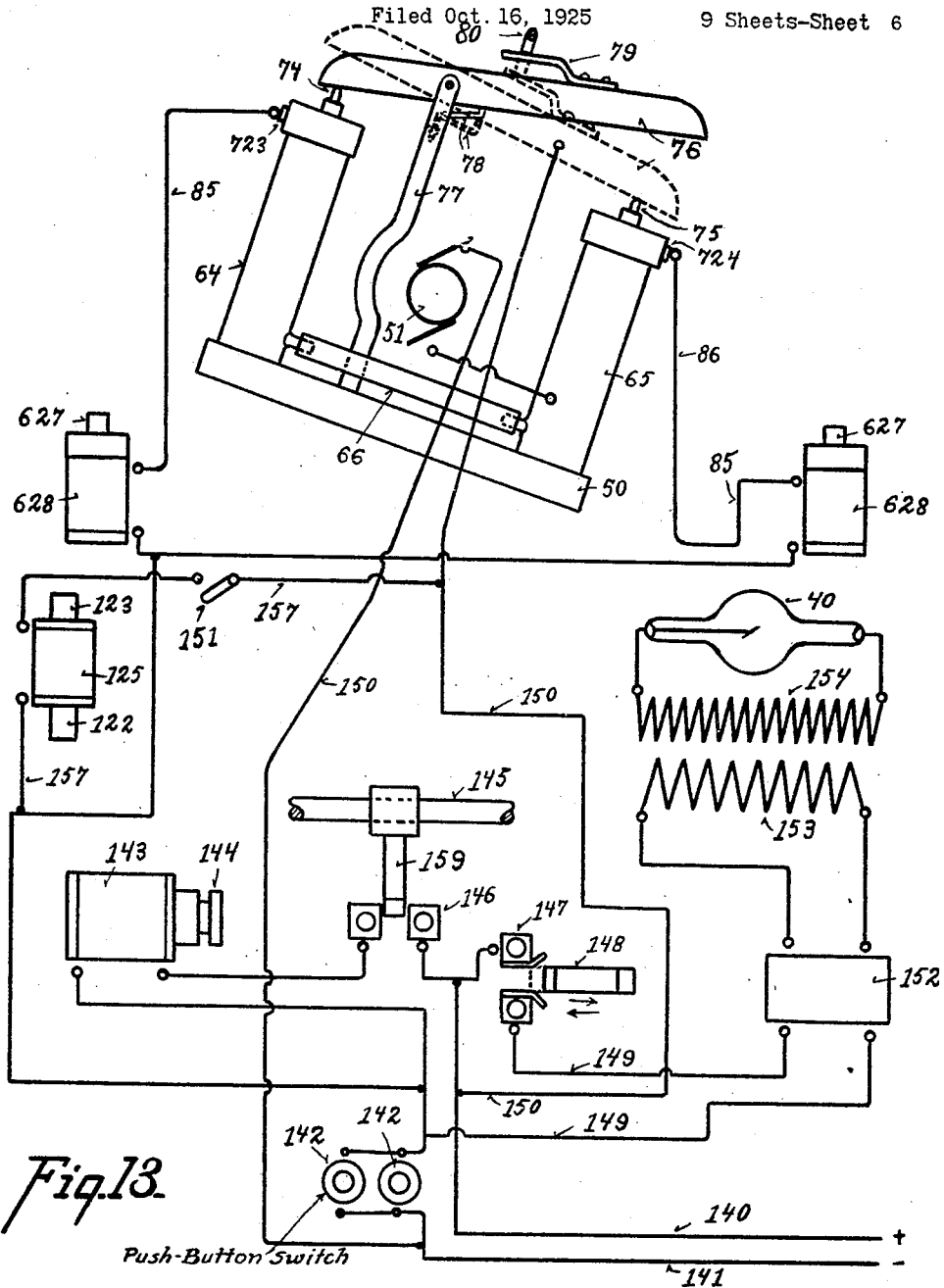

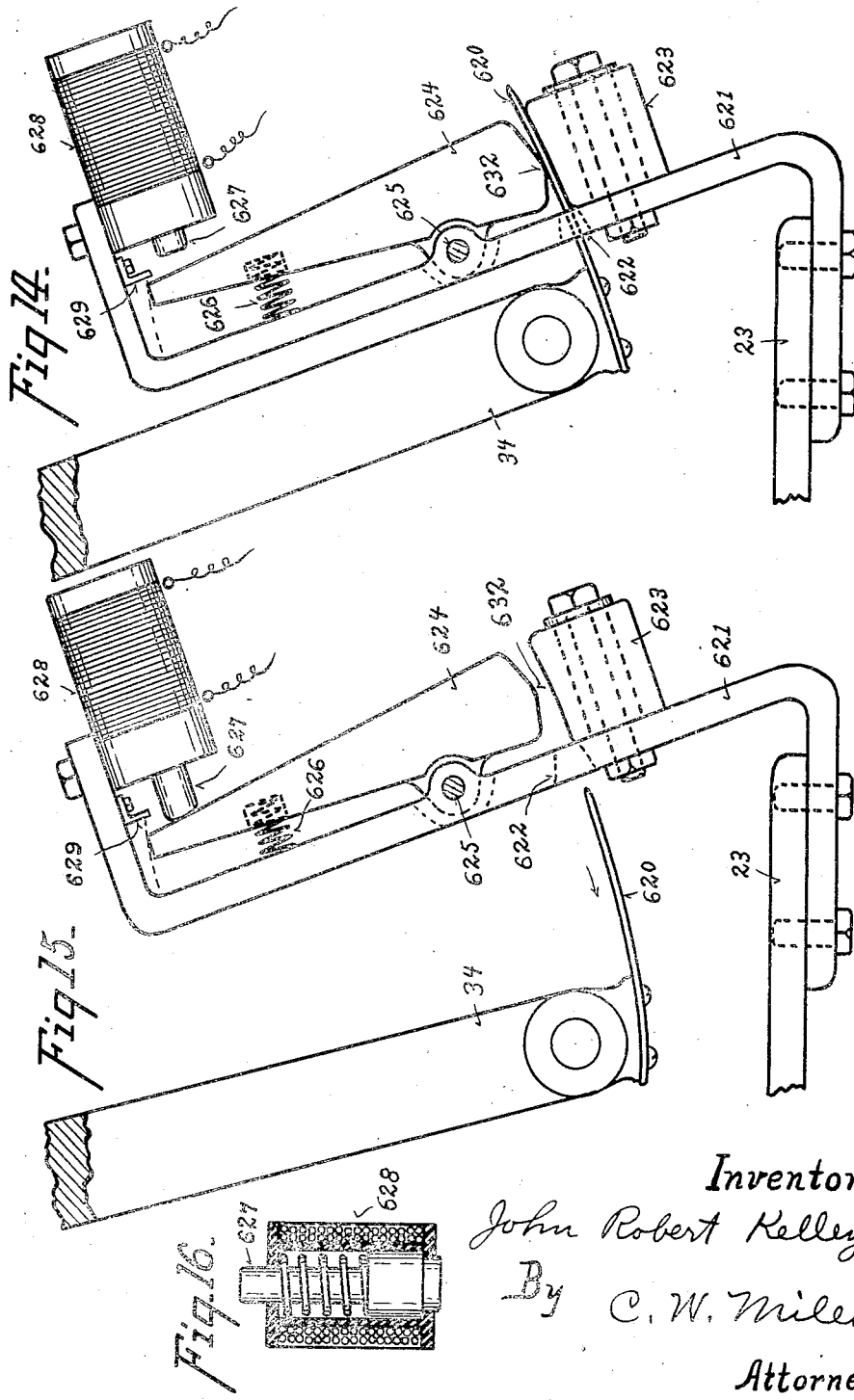

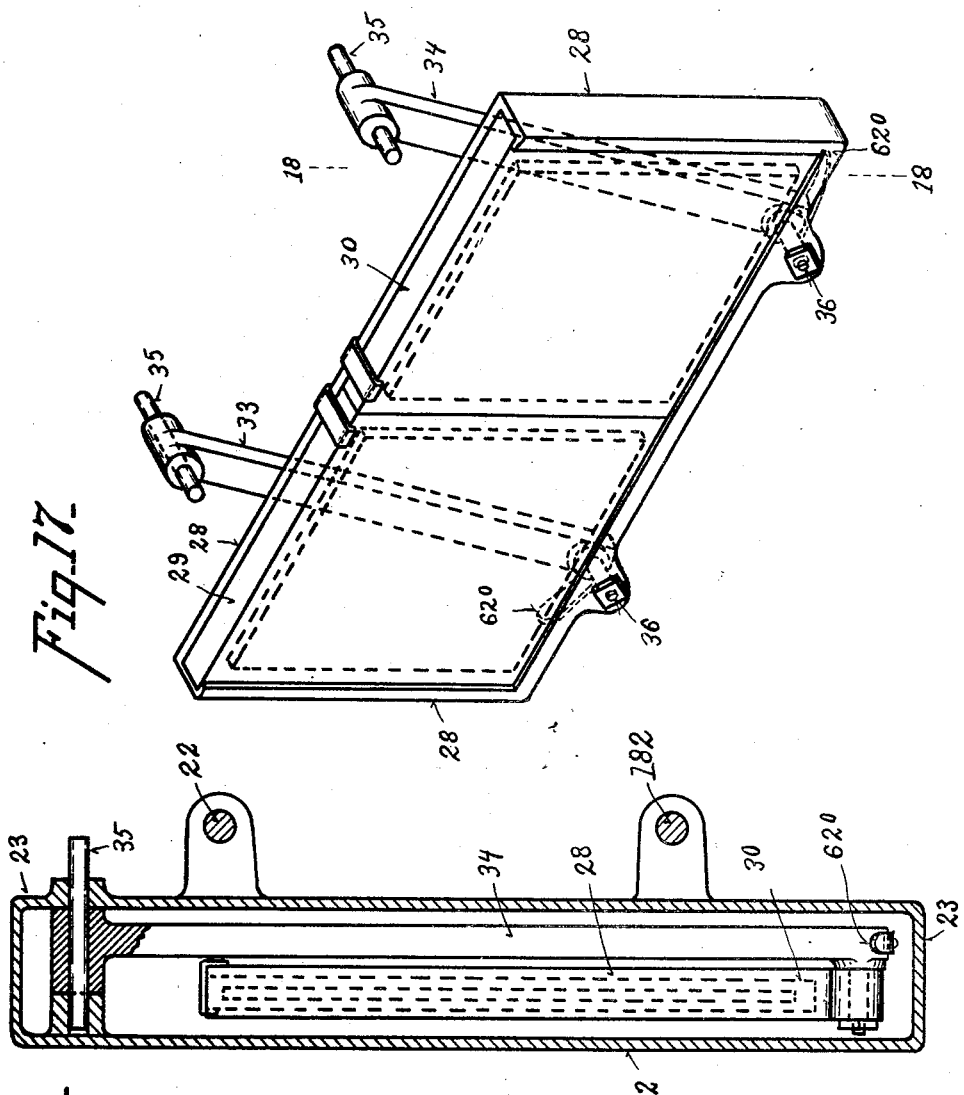

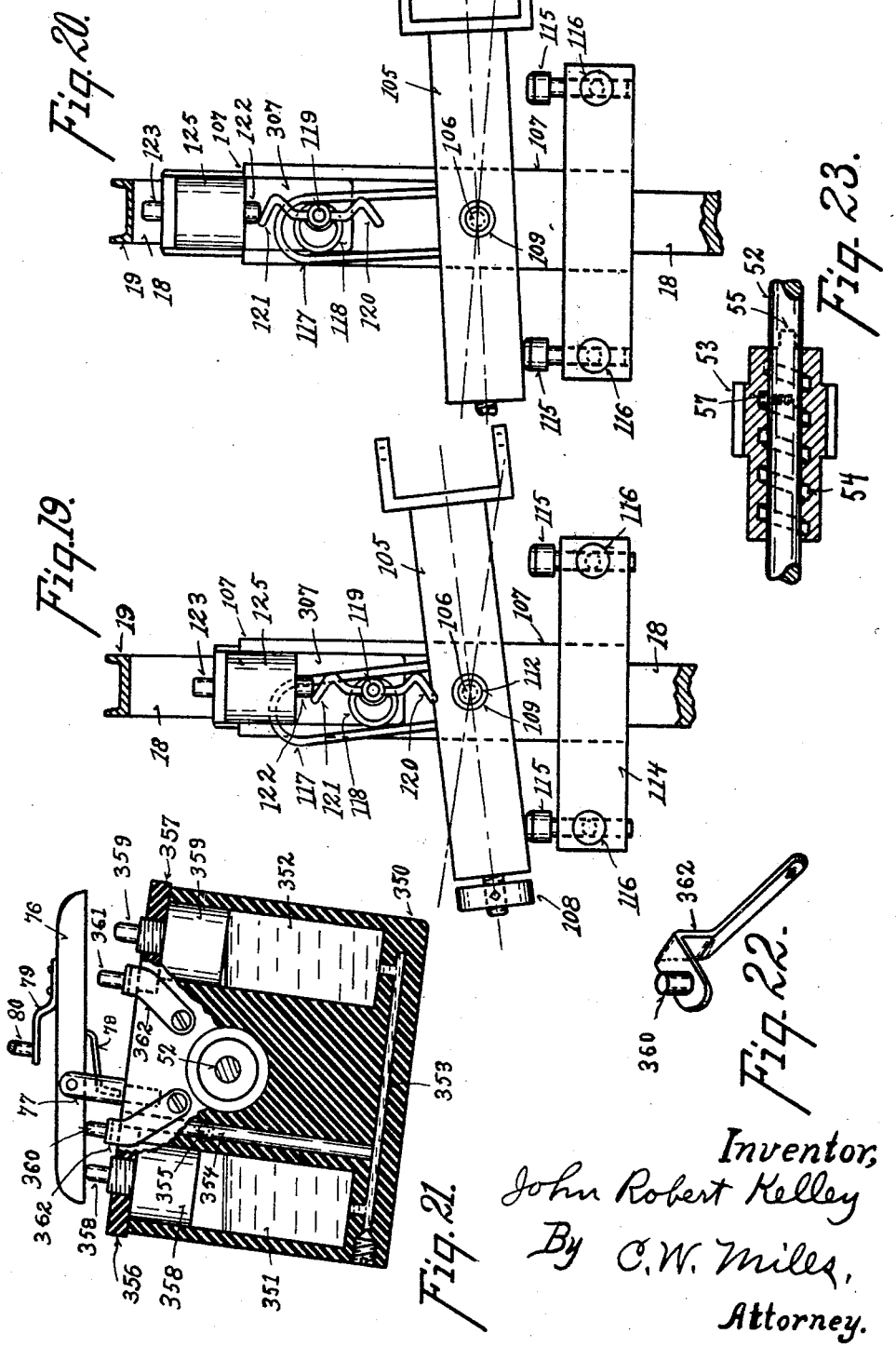

Patented Mar. 29, 1927.

1,622,320

UNITED STATES PATENT OFFICE.

JOHN ROBERT KELLEY, OF COVINGTON, KENTUCKY.

RADIOGRAPHIC APPARATUS.

Application filed October 16, 1925. Serial No. 62,922.

My invention relates to improvements in radiographic apparatus. One of its objects is to provide improved means to support, release, and expose the sensitive plates. Another object is to privide improved means whereby a patient may be supported in position to be radiographed. Another object is to provide improved means to support, release and successively expose a plurality of sensitive plates for the purpose of producing stereoscopic effects. Another object is to provide improved electrically actuated means to release and expose one or a series of sensitive plates. Another object is to provide improved means to shift and expose sensitive plates adapted to prevent shifting and exposing the plates except in a prescribed order, to thereby prevent errors in exposure and waste of material or failure to secure the desired results. Another object is to provide improved means operable from a plurality of positions of the operator to release and expose sensitive plates, and to release and expose the plates without causing vibration of the plate supporting members. My invention also comprises certain details of form and combination and arrangement of components, all of which will be fully set forth in description of the accompanying drawings, in which:

Fig. 1 is a plan of my improved radiographic apparatus.

Fig. 2 is a front elevation of the apparatus shown in Fig. 1.

Fig. 3 is an enlarged front elevation of the sensitive plate supporting and adjusting apparatus.

Fig. 4 is a plan of the apparatus shown in Fig. 3.

Fig. 5 is a rear elevation of the apparatus shown in Figs. 3 and 4.

Fig. 6 is an enlarged side elevation of a means employed to automatically actuate and reset the sensitive plate holder carrying member.

Fig. 7 is a front elevation of Fig. 6.

Fig. 8 is a sectional detail of the automatic circuit closing and opening apparatus employed to control the movements of the apparatus shown in Figs. 6 and 7.

Fig. 9 is a view similar to Fig. 8 illustrating a different position of the parts.

Fig. 10 is a sectional detail illustrating a modification of Figs. 8 and 9.

Fig. 13 is a wiring diagram of the automatic control of the plate holders and X-ray tube.

Fig. 14 is an enlarged detail of the plate holder frame latching means.

Fig. 15 is a view similar to Fig. 14, showing a different position of the parts.

Fig. 16 is a sectional detail of one of the latch releasing solenoids detached.

Fig. 17 is a perspective view of the plateholders, plate-holder frame, and pendulous supports therefor detached.

Fig. 18 is an enlarged sectional detail taken on line 18—18 of Fig. 17.

Fig. 19 is a view similar to Fig. 11, illustrating a different position of the parts.

Fig. 20 is a view similar to Fig. 11, illustrating another position of the parts.

Fig. 21 is a view similar to Fig. 8, illustrating a modification thereof.

Fig. 22 is a detail perspective of one of the contacts of Fig. 2.

Fig. 23 is a detail of the pinion mounting of Fig. 6.

Figure 12:
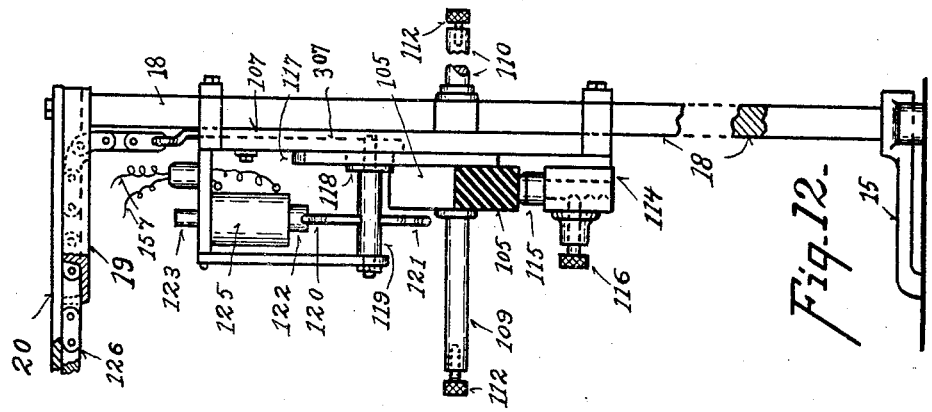
Fig. 12 is a side elevation, partly in section, of the apparatus shown in Fig. 11.

The accompanying drawings illustrate the preferred embodiments of my invention, in which 15 represents a base, from which tubular columns 16 and 17 and a polygonal column 18 project upwardly to form a main support for the operative parts carrying the X-ray generator and the plate holders in which the sensitive plates are mounted.

Metal plates 14 connect the columns 16 and 17 together in pairs at their upper ends and cross-rails or tie-rods 19 and 20 are employed to connect the column 18 to the plates 14 and to the columns 16 and 17 near their upper ends, to afford mutual support therefor. A plate-holder carriage 23 is mounted upon the columns 16 to move vertically thereon. A manually operable shaft 22 journaled to the rear face of carriage 23 is provided with pinions 24 which engage racks 25 attached to the columns 16 to manually adjust the carriage 23 vertically. Chains 26 are mounted upon idler sprocket wheels 27 carried by the plates 14. Chains 26 are connected at one end to the plate holder carriage 23 and at their opposite ends said chains are connected to counter weights, which preferably slide vertically within the columns 17 whereby the weight of the carriage 23 is substantially counterbalanced and the shaft 22 when operated serves to raise or lower the carriage 23 to any desired position, where the carriage 23 tends to remain in equilibrium until shifted to a new position.

The carriage 23 comprises a sheet metal container to serve as a support and housing for an adjustably mounted plate holder frame 28, and a plurality of plate holders 29 and 30, detachably mounted upon said plate holder frame. The front end sections 31 and 32 of the carriage 23 are both impervious to both X-rays and to light rays. The intermediate front section 39 of the carriage 23 is impervious to light rays but is pervious to X-rays. The remaining walls of the carriage 23 are impervious to X-rays and preferably to light rays.

The plate holder frame 28 is pendulously supported within the interior of the carriage 23, by means of two arms or links 33 and 34 which links are pivotally supported upon horizontal shafts 35 relative to the carriage 23 near the upper ends of said links, and the lower ends of said links are journaled upon stud shafts 36 projecting rearwardly from the lower portion of said plate holder frame 28, whereby the frame 28 is permitted to swing past the center of said carriage in either direction, and to be engaged and held stationarily at opposite extremities of its pendulous movement by means of latch members 37 and 38 carried by the carriage 23, and engaging the lower ends of said links 33 and 34 respectively. The carriage 23 is provided with a door 39 constituting the said front intermediate section which is pervious to X-rays, and said door provides convenient means whereby the plate holders may be placed in position on the plate holder frame 28 and removed therefrom. When the frame 28 is latched in the position shown in Fig. 3 to the left of the center of the carriage 23, the right hand plate holder 30 is in position to be exposed to X-rays entering through the pervious section or door 39, while the left hand plate holder 29 is in rear of the impervious end section 31 of the carriage 23. When the frame 28 is moved to its extreme right hand position the plate holder 30 is in rear of the impervious carriage section 32 while the plate holder 29 is moved to a position in rear of the pervious section or door 39.

With sensitive plates in the respective plate holders 29 and 30, and said plate holders detachably mounted upon the plate holder frame 28, and the door 39 closed, a person or object to be radiographed is placed against the front or outer face of the door 39 which door serves the purpose of spacing the object to be radiographed from and relative to the plate holders and sensitive plates. The object to be radiographed is also thus interposed between said door 39 and the X-ray generating tube or member 40 which is adjustably supported from and relative to the standard or vertical column 18. The patient or object to be radiographed is designed ordinarily to stand upon the floor in front of the carriage 23, and the carriage 23 and also the X-ray tube 40 are capable of a range of vertical adjustment to enable radiographic exposures to be made of any portion of a patient from the head to the ankles while the patient is in a standing position, and while standing either front, rear, or sidewise to the X-ray generator.

It frequently happens that a patient through weakness, or otherwise is unable to stand, and to provide for conveniently making radiographic exposures under such circumstances, I provide sufficient space between the respective pairs of columns 16 and 17 to enable a hospital cot 41 with the patient thereon to be wheeled into position between the columns 17, whereupon the patient may be brought to a sitting or other desired position in front of the carriage 23 and supported by the cot during the period of radiographic exposure as indicated in dotted lines in Figs. 1 and 2.

By supporting the plate holder frame 28 pendulously relative to the carriage 23 I am enabled to release the frame 28 from one of the latch members 37 and 38, for instance from the latch member 37, and to engage the frame 28 with the latch member 38 practically at the limit of its forward swing and at a point where practically all of its energy and forward momentum have been absorbed and before energy or momentum on the return movement have been acquired, and hence to be able to lock the frame 28 to the carriage 23 without imparting vibration to any extent to either the carriage or the frame 28. Thus a radiographic exposure may follow immediately upon a plate holder movement without showing the effect or influence of vibration upon the sensitive plate or negative, which is particularly desirable in making stereoscopic exposures.

Sheet metal strips 620 are rigidly attached to the lower free ends of the respective links 33 and 34. These strips are each curved to lie substantially within the arc of a circle drawn with the shaft 35 as a center, and said strips are preferably flexible to a limited extent and serve as means for latching the pendulous arms 33 and 34, and plate holder frame 28 at opposite extremities of their pendulous movement.

The respective latch members shown in detail in Figs. 14, 15 and 16 each comprise a frame 621 rigidly attached to the frame of the plate holder carriage 23. The frame 621 is provided with a perforation or eye 622 through which the free ends of the strips 620 enter and leave. Adjustably but rigidly attached to the frame 621 is a shoe or gripping jaw 623. A movable latch member or gripping jaw 624 preferably provided with a relatively narrow gripping face 632, is pivotally attached to the frame 621 at 625 and is actuated by a spring 626 tending normally to grip the end of the strip 620 between the rigid jaw 623 and the face 632 of the movable jaw 624 while at the same time permitting the movable jaw 624 to yield when the end of the strip 620 is thrust between said jaws until the strip 620 has reached the limit of its pendulous movement and has practically come to a position of rest and is about to commence a movement in the reverse direction, whereupon the movable jaw 624 actuated by the spring 626 grips the strip 620 with practically no slip or lost motion rigidly in position between the movable jaw 624 and the rigid jaw 623 at any position along the face of the strip 620 as shown in Fig. 14, and with practically no vibration imparted either to the plate-holder frame 28 or to the carriage 23, which could injuriously effect the making of exposures upon the sensitive plates. The plateholder frame and plate-holders are thus rigidly locked to the plate holder carriage at one extremity of the pendulous movement of said plate holder frame until the movable jaw 624 is tripped by the action of the armature 627 of the solenoid 628 against the upper end of the movable jaw 624 to counteract the spring 626 and tilt the movable jaw 624 away from the stationary jaw 623 to release the strip 620 which release occurs when the solenoid 628 is electrically energized either by manually or automatically closing an electrical circuit through said solenoid. An adjustable stop 629 is preferably employed to limit the movement of the movable jaw 624 under the action of the spring 626 and to prevent the movable jaw making contact with the stationary jaw. In practice due to a variety of factors the degree of pendulous swing is not accurately uniform one time with another, while the average of a number of such pendulous swings is substantially fixed and uniform. My improved means for latching the plate holder frame provides for and accommodates itself to such variation as may occur in the degree of pendulous swing of the plate holder frame and provides for locking the frame to the carriage at the maximum movement attained at each swing in such manner as to continuously and reliably eliminate vibration and permit the plate holder frame to be released and to operate with a substantially uniform average pendulous movement.

In order that the frame 28 may continue to swing when released from one latch member, into engagement with the opposite latch member, I provide and apply to act upon or energize one of the shafts 35 a relatively small supplemental weight 48, which may be either manually or automatically shifted after each swinging movement of the frame 28, so as to be in position to assist in swinging the frame 28 at its next movement far enough in a reverse direction to reach and be engaged by one of said latch members 37 and 38.

In Figs. 6, 7, 8, 9, 10 and 13 I have illustrated mechanism by means of which this supplemental weight 48 is automatically shifted, after the lapse of a short period of time, and following each swing of the plate holder frame 28, by electrically actuated means. As illustrated in Figs. 6 and 7, an arm or frame 50 is rigidly attached to the end of one of the shafts 35 outside of the carriage 23 at the rear thereof so as to oscillate with said shaft 35, and with the plate holder frame 28 and the arms 33 and 34 supporting said frame 28. Mounted upon the frame 50 is an electric motor 51, having electrical connections by means of which said motor is adapted to be intermittently rotated in one direction. On the shaft 52 of said motor is a pinion 53 the hub of which has a spiral groove 54 cut in its bore to engage a pin 57 projecting from the side of the motor shaft 52. A clutch member 55 on the end of the hub of the pinion 53 engages normally with a clutch member on a friction disc or brake shoe 56 journaled upon the motor shaft 52 and normally bearing against the face of the frame 50. A coiled spring 58 serves to normally force the pinion 53 against the brake shoe 56 tending to bring the motor to a stop. When current is supplied to the motor 51 causing the motor to rotate the pin 57 travels along the spiral groove 54 a sufficient distance so as to shift the pinion 53 endwise of the motor shaft against the action of the coiled spring 58 to unclutch the pinion from the brake shoe 56, thereby allowing the motor to rotate freely so long as current is supplied to the motor. As soon as current is cut off from the motor 51, the spring 58 acts to clutch the pinion to the brake shoe 56 and to force the shoe 56 against the face of the frame 50 to bring the motor quickly to a position of rest. The pinion 53 meshes with and drives a spur gear 59 the tubular hub of which is journaled upon a stud shaft 60 which is concentric with the shaft 35. The supplemental weight 48 is adjustably mounted upon one face of the gear 59 by means of a radial slot 61 and clamping bolt 62. The motor 51 is employed to drive the gear 59 a fraction of a revolution at each operation of the motor to thereby shift the weight 48 alternately to the opposite side of the center of the shaft 60, as indicated in Fig. 7.

Mounted upon the frame 50 upon opposite sides of the motor 51 are reservoirs 64 and 65 designed to be partly filled with mercury or other fluid electrical conductor. A rubber hose or other conduit of restricted cross section 66 connects the lower ends of the reservoirs 64 and 65 together and enables mercury to flow slowly from one reservoir to the other and to seek a common surface level in both reservoirs. In each of said reservoirs is a float or plunger 67 preferably of nonconducting material which has a core 68 of metal or other electrical conducting material with its ends extending above and below the ends of said respective floats. The upper ends of the respective reservoirs 64 and 65 are fitted with caps 70 and 71 of nonconducting material which are provided with cores 72 and 73 of metal or other electrical conducting material. Resilient energized plungers or electrical contact members 74 and 75 are mounted to move endwise relative to the core members 72, being actuated by springs 720 in one direction and rocker arm 76 in the opposite direction to alternately close electric circuit branches 85 and 86 through the arm 76 and binding posts 723 and 724 and to close a branch circuit 150 through one or other of said plungers 74 and 75 to one or other of the core members 73 and contacts 68. Disks of insulating material 725 in contact with the lower ends of the springs 720 prevent current passing by way of the springs 720 from the core members 72 to the core members 73. A rocker arm or switch lever 76 is pivotally attached to a standard 77 projecting up from the frame 50 adjacent to said reservoirs 64 and 65. A spring 78 is attached to the standard 77 and its free end resiliently engages the switch lever 76 tending to tilt one end, for instance the right hand end, of said lever 76 upwardly. A resilient arm 79 projects from the upper edge of the switch lever 76 and at its free end is rigidly attached one end of a thrust rod 80. The opposite or free end of the thrust rod 80 passes through a perforation in a guide 81 carried by a collar 82 which is adjustably and stationarily mounted upon the free end of the stud shaft 60. A cam 83 is mounted rigidly upon the tubular hub 84 of the gear 59 so as to rotate with said gear. The free end of the thrust rod 80 bears yieldingly upon and rides upon the face of the cam 83, which thereby causes the switch lever 76 to rock upon its pivotal joint as indicated in Figs. 8 and 9 to alternately close branches 85 and 86 and also close a gap in circuit branch 150 of the electric circuit shown in Fig. 13 preparatory to manually closing a circuit branch to energizing one or other of the solenoids 628 of the latch members 37 and 38, and thereby release the plate holder frame 28, and allow it to swing to its reverse position.

The X-ray generator 40 is mounted at one end of a rocker arm 105 which is pivotally mounted at 106 upon a carriage 107 which travels vertically upon the standard 18. A weight 108 adjustable upon the opposite end of the rocker arm 105 enables the rocker arm and X-ray generator to be accurately counterbalanced upon its pivotal support 106. The arm 105 is preferably of insulating material, and is preferably provided with cross arms 109 and 110 also of insulating material. The respective high tension electrical conductors leading to the terminals of the X-ray generator are designed to be clamped by clamping screws 112 to the ends of the cross arms 109 and 110 with sufficient slack between said clamps and the X-ray generator to enable the rocker arm 105 and X-ray generator to oscillate within prescribed limits upon the carriage 107. A cross bar 114 rigidly mounted upon the carriage 107 below the rocker arm 105 is provided with vertically adjustable stop members 115 to be engaged respectively by the rocker arm 105 to prescribe and limit the oscillation of said arm 105. Latch members 116 are adapted to engage any one of a series of recesses in the shanks of the stop members 115 whereby different limits of oscillation may be prescribed for the arm 105 by different vertical adjustments of the stops 115, see Figs. 19 and 20. A yoke 117 projects upwardly from the arm 105 and engages opposite faces of an eccentric 118 which is mounted upon a shaft 119 journaled at opposite ends to the carriage 307 which is vertically adjustable upon the carriage 107. The shaft 119 also carries curved arms 120 and 121 which are mounted in position to respectively engage the blunt nose armature 122 of a solenoid 125 which is mounted upon the carriage 307 and is substantially the same as shown in Fig. 16 except that it is provided with a manually operable projection 123 at its upper end, and which when actuated drives the blunt nose of armature 122 downwardly upon the bent free end of one of the arms 120, or 121 to thereby cause the shaft 119 to make substantially a half revolution causing the eccentric 118 to act upon the yoke 117 to thereby shift the rocker arm 105 to the opposite limit of its movement where the eccentric being nearly upon dead center tends to hold the rocker arm until the nose of armature 122 is again actuated to strike the arms 120 or 121 to reverse the movement of the rocker arm 105. Each operation of the armature 122 causes one of the arms 120, 121 to move away from the armature 122 and the opposite of said arms 120, 121 to approach said armature. A sprocket chain 126 is attached at one end to the carriage 107, and said chain through its middle section travels along the channel or groove of the cross bar 19 to a sprocket wheel 127 mounted upon one of the plates 14, and thence to a weight 128 which serves to counterbalance the weight of the carriage 107 and parts carried thereby and to thereby enable said carriage 107 to move up and down upon the standard 18 with practically no effort upon the part of the operator. I also preferably mount the sprocket wheel 127 rigidly upon the same shaft with the sprocket wheel 27, whereby the carriage 107 is caused to move up and down in unison or in step with the plate holder carriage 23, and to thereby enable both carriages to be adjusted together by means of the hand lever 22, and to continuously keep the X-ray tube in substantially the same vertical relation to the plate holder carriage, except as modified by the oscillation of the rocker arm 105.

In Fig. 13 I have illustrated one type of electrical circuit adapted to be employed to actuate my improved apparatus in which 140 and 141 represent the line wires or source of electrical energy, and 142 one or more electrical circuit closing switches, preferably of the push-button variety adapted to be actuated by the operator close to or at a distance from the apparatus. Where a Bucky diaphragm is employed 143 represents a solenoid the armature 144 of which un latches or releases the diaphragm and the movement of the diaphragm in turn rotates the shaft 145 carrying a switch arm 159 which has closed the switch 146 before the diaphragm has commenced its forward travel. The switch 146 remains closed until the forward movement of the diaphragm is nearly completed whereupon the switch 146 automatically opens and remains open until the diaphragm is reset for a fresh forward movement.

A switch 147 is closed by an arm or blade 148 actuated in unison with the movements of the diaphragm to close a branch electrical circuit 149 shortly after the diaphragm has commenced its forward movement. The branch circuit 149 is opened at switch 147 shortly before the forward movement of the diaphragm is completed by movement of the switch arm 148 endwise. Included in the branch circuit 149 is an electrically actuated circuit closing and opening member 152 which serves to temporarily close the primary circuit 153 of a high tension transformer to thereby develop a high tension flow in the high tension circuit 154 in which circuit the X-ray tube 40 is included and thereby energized for a sufficient period of time to make a radiographic exposure upon a sensitive plate, after which the branch circuit 149 and the primary 153 are opened.

Figure 11:
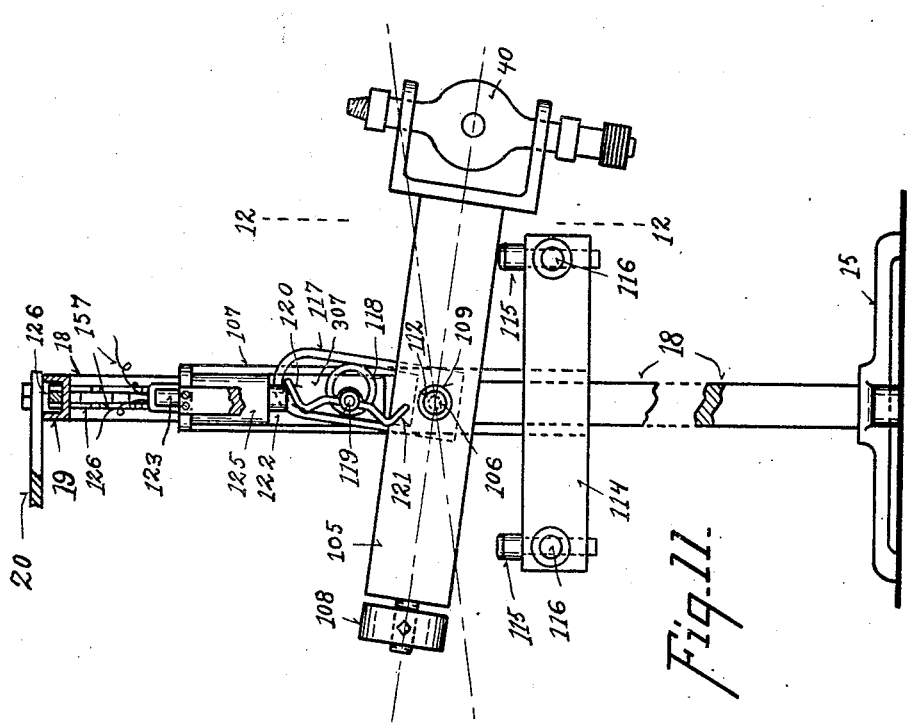
Fig. 11 is an enlarged front elevation of the X-ray tube supporting and shifting apparatus detached.

The motor 51 of Fig. 13 and its frame 50 are carried by one of the shafts 35 and move pendulously with the plate holder frame 28. It is designed that following a short time interval or period of rest after each pendulous movement of the plate holder (which pendulous movement of the plate holder follows a plate exposure) the motor 51 and gear 56 be automatically carried through a cycle of movement to shift the weight 48 to the opposite side of the center of gravity of its supporting shaft 35 to thereby be in a position to assist in driving the plate holder frame 28 forward upon its next pendulous swing. To actuate the motor 51 said motor is included in the branch circuit 150 together with the rocking arm 76, contacts 74 and 75, and tubes 64 and 65. Assuming that the plate holder frame 28, and motor frame 50 have just swung from one position to the other, the mercury in the cylinders will have broken the circuit branch 150 at one of the plunger contacts 68, see Fig. 8, and will not yet have closed the circuit branch 150 at the opposite plunger contact 68, hence while the swing of the frame 50 serves to break the circuit branch 150 at for instance the contact 74 and to close said branch 150 at the contact 75, the branch 150 through the motor 51 will not be completely closed so as to rotate the motor 51 until the mercury has flowed through the restricted passage from cylinder 64 to cylinder 65 sufficiently to cause the plunger contact 68 of cylinder 65 to make contact with the member 73 of cylinder 65, as shown in Fig. 8, which represents the position of the parts at the instant that the motor circuit is closed. Thereby a period of thirty seconds or more if desired elapses after the plate holder frame 28 and motor frame 50 have reached a position of rest before the circuit branch 150 is closed through the motor at contacts 68 and 73, causing the motor 51 and gear 59 to move and shift the weight 48 and rocker arm 76 to a new position ready to assist the plate holder frame 28 at its next pendulous movement. The rocker arm 76 and contacts 74 and 75 also control and serve to alternately open and close branch circuits 85 and 86 in which branches are respectively included the solenoids 628 of the respective latch members 37 and 38 in such manner that actuation of the push button 142 by the operator will energize one only of said solenoids, thereby releasing one of the strips 620 from its latch members 623 and 624 and thereby releasing the plate holder frame 28 to make another pendulous swing. Each swing of the frame 28 results in opening one of the circuit branches 85 and 86 at the contacts 74 and 75 and closing the other of the branches 85 and 86 ready to be closed at will by the operator at the push button 142, as indicated in Fig. 13. Where it is desired to make stereoscopic radiographic exposures the circuit branch 157, see Figs. 11, 12 and 13 is arranged temporarily through closing of a switch 151, to be also closed through energizing the solenoid 125 when the push button 142 is closed by the operator, thereby causing the position of the X-ray tube 40 to be shifted vertically during the period in which the plate holder frame 28 makes its pendulous swing.

A small weight 170 preferably having a michrometric adjustment upon an arm 171 carried by the opposite shaft 35 to that on which the motor frame 50 is mounted, see Fig. 5, serve to secure and maintain an accurate or fine adjustment or counter-balance of the pendulously movable members, tending to maintain uniform pendulous movement of said members. A roll 180 of paper is mounted upon the rear of the plate holder carriage 23, and the free end of the roll of paper is designed to be drawn up over the top of the carriage 23 and interposed between the door section 39 and the body of the person to be radiographed for aseptic reasons. I also preferably provide members 190 upon the front of the carriage 23 by means of which the person to be radiographed may be strapped or otherwise held rigidly in place relative to the carriage covering the period of radiographic exposure. A shaft 182 journaled to the rear of the carriage 23 is provided with clamping jaws 183 or similar means actuated by the rotation of said shaft 182 to rigidly clamp the carriage 23 in position upon one or both of the columns 16 covering the periods of radiographic exposure.

In the modification Figs. 21 and 22 I provide a container 350, for the mercury contact heretofore described in connection with Figs. 8 and 9, which container is preferably molded in one piece from hard rubber or similar electrical insulating material, to take the place of the cylinders 64 and 65 of Figs. 8 and 9. The container 350 is provided with two mercury chambers or reservoirs 351 and 352, which are connected by means of a restricted channel 353, through which mercury is free to flow slowly from one chamber to the other. A steel rod 354 serves as an electrical contact to the mercury, and the rod 354 is in turn electrically connected to a binding screw 355 located exteriorly of the member 350. Contact 355 is electrically connected to one terminal of the motor 51. The upper ends of the chambers 351 and 352 are closed by cap members 356 and 357, into which are threaded metal contact members 358 and 359 with the external upper ends of which the rocker arm 76 is adapted to alternately make contact. A set of contact members 360 and 361 are mounted resiliently relative to member 350, upon sheet metal spring arms 362, which are connected to the exterior of member 350, and insulated thereby from the other electrical contacts carried by member 350. The rocker arm 76 is adapted to also alternately engage the contact members 360 and 361 to thereby alternately close branch electrical circuits 85 and 86 in which solenoids 628 are respectively included. The apparatus shown in Fig. 21 is designed to be employed in place of that shown specifically in Figs. 8 and 9, and to be operated in substantially the same manner. The apparatus of Fig. 21 is designed to more efficiently provide against the accidental escape of mercury, to reduce the cost of construction and maintenance. In operation after each pendulous swing of the member 350 when mounted upon the frame 50, the mercury flows through conduit 353 from one mercury reservoir to the other, for instance from reservoir 351 into reservoir 352, breaking contact between the mercury and member 358, and after a time interval making contact between the upper surface of the mercury and the inner end of contact 359.

I contemplate modifying the electrical circuit as illustrated in the drawings, particularly as shown in Fig. 13, to meet the requirements of different types of operators, and different operating requirements, as for instance by omitting the Bucky diaphragm and the diaphragm controlled switches, or automatically controlled switches, and operating the latch releasing solenoids to pendulously shift the plate holder, the primary of the high tension transformer, and the X-ray generator shifting solenoid, manually either jointly or independently through push-button or other switch mechanism.

While the apparatus illustrated in Figs. 6, 7, 8, and 9 is preferably operated automatically by electrical means substantially as heretofore described; said apparatus is adapted to be, in a less expensive type of apparatus, manually operated to shift the position of the weight 48, and to close one or other of the circuits 85 and 86, and to open the other, ready for a fresh radiographic exposure, as for instance turning the wheel 59 by hand. Also the motor 51 may be entirely omitted, and the wheel 59 or equivalent member actuated by hand after each exposure.

I am thereby enabled to provide superior adjustments and relations of the objects to be radiographed to the radiographic apparatus; to provide for a superior and practically vibrationless adjustment of the sensitive plates; to provide for the application of an auxiliary weight to assist in the pendulous movement of the sensitive plates; to automatically adjust such auxiliary weight after each pendulous movement; to provide improved latch and latch releasing means; to shift the auxiliary weight after the lapse of a time element; to automatically open and close the respective circuit branches; to adjust the X-ray tube and the sensitive plates in unison, and to shift the sensitive plates and X-ray tube in unison for stereoscopic exposures, besides other important advantages, incident to my improved apparatus.

The apparatus herein shown and described is capable of considerable modification within the scope of the claims, without departing from the spirit of my invention.

What I claim is:

1. A radiographic apparatus comprising in combination with a source of radiant energy, and shields spaced apart and impervious to radiant energy, a plate holder supporting member pendulously supported and adjustable in rear of said shields, a plate holder mounted upon said supporting member and movable therewith relative to said shields, and a space pervious to radiant energy intermediate of said shields, means to release said supporting member from one fixed position near one extremity of its pendulous movement, means to latch said supporting member after a period of movement to another fixed position near the opposite extremity of its pendulous movement, and an energizing member adjustable into engagement with said supporting member to insure a substantially uniform predetermined pendulous movement of said supporting member.

2. A radiographic apparatus comprising in combination with a source of radiant energy, and shields spaced apart and impervious to radiant energy, a plate holder supporting member pendulously supported and adjustable in rear of said shields, a plate holder mounted upon said supporting member and movable therewith relative to said shields, and a space pervious to radiant energy intermediate of said shields, means to release said supporting member from one fixed position near one extremity of its pendulous movement, means to latch said supporting member after a period of movement to another fixed position near the opposite extremity of its pendulous movement, and an energizing member alternately adjustable into engagement with said supporting member to insure a substantially uniform predetermined pendulous movement of said supporting member alternately in opposite directions.

3. A radiographic apparatus comprising in combination with a source of radiant energy and a shield impervious to radiant energy, a plate holder pendulously supported with reference to said shield to move to or from a shielded position in rear of said shield, means to release said plate holder from one fixed position at one extremity of its pendulous movement, means to latch said plate holder after a period of movement to another fixed position at the opposite extremity of its pendulous movement, and an energizing member adjustable into engagement with said plate holder to insure movement of said plate holder from one fixed position to the other fixed position.

4. A radiographic apparatus comprising in combination with a source of radiant energy and a shield impervious to radiant energy, a plate holder pendulously supported with reference to said shield to move to or from a shielded position in rear of said shield, means to release said plate holder from one fixed position at one extremity of its pendulous movement, means to latch said plate holder after a period of movement to another fixed position at the opposite extremity of its pendulous movement, and an energizing member reversably adjustable into engagement with said plate holder to insure movement of said plate holder alternately in opposite directions from one fixed position to the other fixed position.

5. A radiographic apparatus comprising in combination with a source of radiant energy and a shield impervious to radiant energy, a plate holder pendulously supported with reference to said shield to move to or from a shielded position in rear of said shield, means to release said plate holder from one fixed position at one extremity of its pendulous movement, means to latch said plate holder after a period of movement to another fixed position at the opposite extremity of its pendulous movement, and an energizing member manually adjustable into engagement with said plate holder to insure movement of said plate holder from one fixed position to the other fixed position.

6. A radiographic apparatus comprising in combination with a source of radiant energy and a shield impervious to radiant energy, a plate holder pendulously supported with reference to said shield to move to or from a shielded position in rear of said shield, means to release said plate holder from one fixed position at one extremity of its pendulous movement, means to latch said plate holder after a period of movement to another fixed position at the opposite extremity of its pendulous movement, and a supplemental energizing member manually adjustable into engagement with said plate holder to insure movement of said plate holder from one fixed position to the other fixed position.

7. A radiographic apparatus comprising in combination with a source of radiant energy and a shield impervious to radiant energy, a plate holder pendulously supported with reference to said shield, latch members to respectively latch said plate holder at substantially opposite limits of its pendulous movement, an electrically operable latch releasing member, an electrical circuit in which said latch releasing member is included, and a reversable energizing member adjustable into engagement with said plate holder and serving also to open and close said electrical circuit to insure movement of said plate holder from one fixed position to the other fixed position.

8. A radiographic apparatus comprising in combination with a source of radiant energy and a shield impervious to radiant energy, a plate holder pendulously supported with reference to said shield, latch members to respectively latch said plate holder at substantially opposite limits of its pendulous movement, an electrically operable latch releasing member, an electrical circuit in which said latch releasing member is included, and an operable energizing member adjustable into engagement with said plate holder and serving also to open and close said electrical circuit to insure movement of said plate holder from one fixed position to the other fixed position.

9. A radiographic apparatus comprising in combination with a source of radiant energy and a shield impervious to radiant energy, a plate holder pendulously supported with reference to said shield, latch members to respectively latch said plate holder at substantially opposite limits of its pendulous movement, an electrically operable latch releasing member, an electrical circuit in which said latch releasing member is included, and a supplemental energizing member adjustable into engagement with said plate holder and serving also to open and close said electrical circuit to insure movement of said plate holder from one fixed position to the other fixed position.

10. A radiographic apparatus comprising in combination with a source of radiant energy and a shield impervious to radiant energy, a plate holder pendulously supported with reference to said shield, latch members to respectively latch said plate holder at substantially opposite limits of its pendulous movement, electrically operable latch releasing members, electrical circuits in which said latch releasing members are included, and a reversable energizing member adjustable into engagement with said plate holder and serving also to open and close said respective electrical circuits to insure movement of said plate holder alternately in opposite directions from one fixed position to the other fixed position.

11. A radiographic apparatus comprising in combination with a source of radiant energy, a plate holder pendulously supported with reference to said shield, latch members to respectively latch said plate holder at opposite limits of its pendulous movement, said latch members respectively comprising a tongue, a pair of clamping jaws set to normally permit the tongue to enter between said jaws moving in one direction and to prevent removal of said tongue moving in the opposite direction, and means operable to trip said jaws and thereby release said tongue and thereby release the plate holder.

12. A radiographic apparatus comprising in combination with a source of radiant energy, a plate holder pendulously supported with reference to said shield, latch members to respectively latch said plate holder at opposite limits of its pendulous movement, said latch members respectively comprising a flexible tongue, a stationary clamping jaw and a movable clamping jaw set to normally permit the tongue to enter between said jaws moving in one direction and to prevent removal of said tongue moving in the opposite direction, and means operable to trip said movable jaw and thereby release said tongue and thereby release the plate holder.

13. A radiographic apparatus comprising in combination with a source of radiant energy and a shield impervious to radiant energy, a plate holder pendulously supported with reference to said shield to move to or from a shielded position in rear of said shield, means operable to release said plate holder from one fixed position at one extremity of its pendulous movement, means to latch said plate holder after a period of movement at another fixed position at the opposite extremity of its pendulous movement, an energizing member adjustable after each pendulous movement of said plate holder into position tending to assist said plate holder at its next pendulous movement, and means released at each pendulous movement of said plate holder and having a cycle of movement comprising a predetermined inactive period followed by an active period and automatically operable to adjust said energizing member into new relations with said plate holder ready to assist at the next pendulous movement of said plate holder.

14. A radiographic apparatus comprising in combination with a source of radiant energy and a shield impervious to radiant energy, a plate holder pendulously supported with reference to said shield to move to or from a shielded position in rear of said shield, means operable to release said plate holder from one fixed position at one extremity of its pendulous movement, means to latch said plate holder after a period of movement at another fixed position at the opposite extremity of its pendulous movement, an energizing member adjustable after each pendulous movement of said plate holder into position tending to assist said plate holder at its next pendulous movement, and means released at each pendulous movement of said plate holder and operable through a cycle of movement to automatically adjust said energizing member into a new position ready to assist at the next pendulous movement of said plate holder.

15. A radiographic apparatus comprising in combination with a source of radiant energy and a shield impervious to radiant energy, a plate holder pendulously supported with reference to said shield to move to or from a shielded position in rear of said shield, means operable to release said plate holder from one fixed position at one extremity of its pendulous movement, means to latch said plate holder after a period of movement at another fixed position at the opposite extremity of its pendulous movement, an energizing member adjustable after each pendulous movement of said plate holder into position tending to assist said plate holder at its next pendulous movement, and electrically actuated apparatus released at each pendulous movement of said plate holder and operable through a cycle of movement to automatically adjust said energizing member into a new position ready to assist at the next pendulous movement of said plate holder.

16. A radiographic apparatus comprising in combination with a source of radiant energy and a shield impervious to radiant energy, a plate holder pendulously supported with reference to said shield, means operable to release said plate holder from one fixed position at one extremity of its pendulous movement, means to latch said plate holder after a period of movement at another fixed position at the opposite extremity of its pendulous movement, an energizing member adjustable after each pendulous movement of said plate holder into position tending to assist said plate holder at its next pendulous movement, and electrically actuated apparatus released at each pendulous movement of said plate holder and operable through a cycle of movement to automatically control electrical circuits through which said plate holder latch mechanism is alternately releasable at opposite limits of its pendulous movement and to automatically adjust said energizing member into a new position ready to assist at the next pendulous movement of said plate holder.

17. A radiographic apparatus comprising a main supporting frame, and a plate holder carriage adjustable vertically upon said frame, said frame having a space intermediate of its upright sections and below the lower edge of said plate holder carriage into which a patient supporting member is adapted to be introduced to support patients who are unable to support themselves in position in front of said plate holder carriage.

18. A radiographic apparatus comprising a main supporting frame, and a plate holder carriage adjustable vertically upon said frame, said frame having a space intermediate of its upright sections and below the lower edge of said plate holder carriage into which a patient supporting member is adapted to be introduced to support in a sitting position in front of said plate holder carriage patients who are unable to support themselves.

19. A radiographic apparatus comprising a main supporting frame, a plate holder carriage adjustable vertically upon said frame, and a patient supporting member movable into and out of position below said plate holder carriage to support a patient in a sitting position in front of said plate holder carriage.

20. A radiographic apparatus comprising in combination with a source of radiant energy and a shield impervious to radiant energy, a plate holder pendulously supported with reference to said shield, means operable to release said plate holder from one fixed position at one extremity of its pendulous movement, means to latch said plate holder after a period of movement at another fixed position at the opposite extremity of its pendulous movement, an energizing member adjustable after each pendulous movement of said plate holder into position tending to assist said plate holder at its next pendulous movement, a fluid electrical contact member having a restricted orifice through which the fluid electrical contact member is adapted to flow to establish an electrical contact after a time interval has elapsed, said fluid electrical contact member being movable in unison with the pendulous movements of said plate holder, an electrical circuit closed after the elapse of said time interval, and electrically actuated apparatus included in said electrical circuit adapted to shift said energizing member to a new position after the lapse of said time interval.

21. Radiographic apparatus comprising a main supporting frame, a plate holder carriage adjustable vertically upon said frame, and provided with a section impervious to radiant rays and a section pervious to radiant rays but impervious to light rays, a plate holder pendulously supported upon said plate holder carriage and movable from a shielded to an exposed position relative to said carriage, an X-ray generator in front of said plate holder carriage adjustable vertically relative to said supporting frame, and means connecting said X-ray generator with said carriage to cause said generator and carriage to travel vertically in unison relative to said supporting frame.

22. Radiographic apparatus comprising a main supporting frame, a plate holder carriage adjustable vertically upon said frame, and provided with a section impervious to radiant rays and a section pervious to radiant rays but impervious to light rays, a plate holder pendulously supported upon said plate holder carriage and movable from a shielded to an exposed position relative to said carriage, an X-ray generator carriage adjustable vertically upon said supporting frame, an X-ray generator adjustably mounted upon said X-ray generator carriage, and located in front of said plate holder carriage, and means connecting said X-ray generator carriage to said plate holder carriage to cause said carriages to travel in unison vertically upon said supporting frame.

23. Radiographic apparatus comprising a main supporting frame, a plate holder carriage adjustable vertically upon and relative to said supporting frame, a rack and pinion to positively feed said carriage relative to said supporting frame, a clamping member to clamp said carriage rigidly to its supporting frame, means to counterbalance the weight of said carriage, a plate holder supported pendulously upon said carriage and latch mechanism operable to latch said plate holder to opposite extremities of its pendulous movement.

24. Radiographic apparatus comprising a main supporting frame, a plate holder carriage adjustable vertically upon and relative to said supporting frame, a rack and pinion to positively feed said carriage relative to said supporting frame, a clamping member to clamp said carriage rigidly to its supporting frame, means to counterbalance the weight of said carriage, a plate holder mounted upon and movable transversely of said carriage and latch mechanism operable to latch said plate holder to said carriage at opposite extremities of the plate holder movement.

25. Radiographic apparatus comprising a main supporting frame, a plate holder carriage adjustable vertically upon and relative to said supporting frame, a rack carried by the supporting frame, a manually operable pinion shaft carried by said carriage to positively feed said carriage relative to said supporting frame, a clamping member to rigidly clamp said carriage to said supporting frame, a manually operable clamp operating shaft carried by said carriage, means to counterbalance the weight of said carriage, a plate holder supported pendulously upon said carriage, and latch mechanism operable to latch said plate holder to said carriage at opposite extremities of its pendulous movement.

26. Radiographic apparatus comprising a supporting member, a vertically adjustable plate holder carriage, a vertically adjustable X-ray generator carriage, an X-ray generator adjustably mounted upon said X-ray generator carriage, and means carried by said X-ray generator carriage operable at the will of the operator to shift the position of said X-ray generator relative to its carriage.

27. Radiographic apparatus comprising a supporting member a vertically adjustable plate holder carriage, a vertically adjustable X-ray generator carriage, an X-ray generator adjustably mounted upon said X-ray generator carriage, means to substantially counterbalance the weight of said plate holder carriage and said X-ray generator carriage and X-ray generator, and a connecting member to cause said plate holder carriage and X-ray generator carriage to move vertically in unison.

28. Radiographic apparatus comprising a supporting member a vertically adjustable plate holder carriage, a plate holder pendulously supported upon said plate holder carriage, a vertically adjustable X-ray generator carriage, an X-ray generator pivotally mounted upon said X-ray generator carriage and adjustable thereon within prescribed limits, and means operable at the will of the operator to shift the position of said X-ray generator.

29. Radiographic apparatus comprising a supporting member, a vertically adjustable plate holder carriage, a plate holder pendulously supported upon said plate holder carriage, a vertically adjustable X-ray generator carriage, an X-ray generator mounted upon said X-ray generator carriage, and a connecting member to cause said plate holder carriage and X-ray generator carriage to move vertically in unison.

30. Radiographic apparatus comprising a supporting member, an X-ray generator carriage an X-ray generator mounted upon said generator carriage, a plate holder carriage in position to intercept a beam of X-rays from said X-ray generator, a plate holder pendulously mounted upon said plate holder carriage, an a connecting member to cause said generator carriage and said plate holder carriage to move in unison.

31. Radiographic apparatus comprising a supporting member, an X-ray generator carriage, an X-ray generator pivotally mounted upon said generator carriage and having a limited movement relative to said generator carriage, stop members adjustable to predetermine the limits of adjustment of said generator relative to said generator carriage, a plate holder carriage in position to intercept a beam of X-rays from said X-ray generator, a plate holder pendulously supported relative to said plate holder carriage and means to latch said plate holder at opposite limits of its pendulous movement.

32. Radiographic apparatus comprising a supporting member, an X-ray generator carriage, an X-ray generator pivotally mounted upon said generator carriage and having a limited movement relative to said generator carriage, stop members adjustable to predetermine the limits of adjustment of said generator relative to said generator carriage, a plate holder carriage in position to intercept a beam of X-rays from said X-ray generator, a plate holder pendulously supported relative to said plate holder carriage, means to latch said plate holder at opposite limits of its pendulous movement, and means to simultaneously release said plate holder and said X-ray generator to cause both the plate holder and the X-ray generator to change their positions during the interval between two radiographic exposures.

33. Radiographic apparatus comprising in combination with an X-ray generator, a plate holder adjustably supported in position to intercept a beam of X-rays from said generator, means to latch said plate holder at opposite extremities of its movement, an energizing member adjustable to alternately act upon said plate holder tending to move the plate holder in an opposite direction, and means having a cycle of movement to unlatch said plate holder and to readjust said energizing member into a new operative relation to said plate holder.

34. Photographic apparatus comprising an X-ray generating member, a plate-holder carriage adjustable across the path of the X-rays issuing from said generator member, a plate holder frame mounted by means of substantially parallel link mechanism upon said plate holder carriage and movable relative to said plate-holder carriage transversely to the direction of movement of said plate-holder carriage, means to release said plate-holder frame from one position of adjustment relative to said plate-holder carriage, and means to lock said plate holder frame to a new position of adjustment relative to said plate-holder carriage.

35. Photographic apparatus comprising an X-ray generating member, a plate-holder carriage adjustable across the path of the X-rays issuing from said generator member, a plate holder frame mounted by means of substantially parallel link mechanism upon said plate-holder carriage and having a pendulous movement relative to said plate holder carriage transversely to the direction of movement of said plate-holder carriage, mechanism to release said plate-holder frame from one position of adjustment relative to said plate holder carriage, and mechanism to lock said plate-holder frame to a new position of adjustment relative to said plate-holder carriage.

36. Photographic apparatus comprising a rigid base, a plurality of substantially vertical supporting standards, a tie-member rigidly connecting the upper ends of said standards together, an X-ray generating member mounted upon one of said standards and having a substantially universal adjustment relative thereto, a plate-holder carriage supported upon a plurality of said standards and vertically adjustable relative thereto, a plate-holder frame mounted by means of link mechanism upon and relative to said plate-holder carriage and having a pendulous movement relative to said plate-holder carriage, and mechanism to lock said plate-holder frame rigidly relative to said plate-holder carriage at substantially opposite extremities of said pendulous movement of said plate-holder frame.

37. Photographic apparatus comprising an adjustable X-ray generating member, a plate-holder carriage adjustably mounted in front of said generating member, said plate-holder carriage being provided with two face sections impervious to X-rays and an intervening face section which is pervious to X-rays, a plate-holder frame adapted to support a plurality of plate-holders and adjustably mounted upon said plate holder carriage to move transversely across and in rear of said pervious and impervious face sections to successively expose the sensitive plates carried by said respective plate-holders to X-rays through said pervious face section, a plurality of plate-holders carried by said plate-holder frame, and mechanism operable to latch said plate-holder frame rigidly in a plurality of positions to said plate-holder carriage.

38. Photographic apparatus comprising an adjustable X-ray generating member, a plate-holder carriage adjustably mounted in front of said generating member, said plate-holder carriage being provided with two face sections impervious to X-rays and an intervening face section which is pervious to X-rays, a plate-holder frame adapted to support a plurality of plate-holders and adjustably mounted by means of link mechanism upon said plate-holder carriage to move pendulously transversely across and in rear of said pervious and impervious face sections to successively expose the sensitive plates carried by said respective plate-holders to X-rays through said pervious face section, a plurality of plate holders carried by said plate-holder frame, and mechanism operable to latch and release said plate-holder frame relative to said plate-holder carriage.

39. Photographic apparatus comprising a plate-holder carriage adjustable transversely to the beam of exciting rays, said carriage being provided with two face sections impervious to X-rays and an intervening face section which is pervious to X-rays, a plate-holder frame mounted upon said carriage in rear of said face sections and adjustable thereon transversely of said carriage to successively expose a plurality of sensitive plates through said pervious face section, mechanism to alternately latch and release said plate-holder frame relative to said carriage, an X-ray generating member located in front of said plate-holder carriage, mechanism to adjust said X-ray generating member a predetermined distance transversely to the face of said plate-holder carriage in the interval between successive exposures of sensitive plates carried by said plate-holder frame.

40. Photographic apparatus comprising a plate-holder carriage adjustable transversely to a beam of exciting rays, said carriage being provided with two face sections impervious to X-rays and an intervening face section which is pervious to X-rays, a plate-holder frame mounted by means of link mechanism upon said carriage in rear of said face sections and having a pendulous movement transversely of said carriage to successively expose a plurality of sensitive plates through said pervious face section, mechanism to latch and release said plate-holder frame relative to said carriage, an X-ray generating member located in front of said plate-holder carriage, mechanism to adjust said X-ray generating member a predetermined distance transversely to the face of said plate-holder carriage in the interval between successive exposures of sensitive plates carried by said plate-holder frame.

41. Photographic apparatus comprising a plate-holder carriage adjustable transversely to a beam of rays, said carriage being provided with two face sections impervious to X-rays and spaced apart leaving an intervening space which is pervious to X-rays, a plate-holder frame mounted by means of link mechanism upon said carriage in rear of said face sections and having a pendulous movement transversely of said carriage to successively expose a plurality of sensitive plates through the space intermediate of said impervious plates, mechanism to latch and release said plate-holder frame relative to said carriage, and a plurality of plate-holders carried in substantially one plane by said plate-holder frame.

42. Photographic apparatus comprising a plate-holder carriage adjustable transversely to a beam of rays, said carriage being provided with two face sections impervious to X-rays and spaced apart leaving an intervening space which is pervious to X-rays, a plate-holder frame mounted by means of link mechanism upon said carriage in rear of said face sections and having a pendulous movement transversely of said carriage to successively expose a plurality of sensitive plates through the space intermediate of said impervious face sections, mechanism to latch and release said plate-holder frame relative to said carriage, a plurality of plate-holders carried in substantially one plane by said plate-holder frame, an X-ray generating member located in front of said plate-holder carriage, mechanism to adjust said X-ray generating member a predetermined distance transversely to the face of said plate-holder carriage in the interval between successive exposures of sensitive plates carried by said plate-holder frame, and electromagnetically actuated apparatus to cyclically energize said X-ray generator, release and latch said plate-holder frame, release said X-ray generator for a change of position, and again energize said X-ray generator in its new position.

43. Photographic apparatus comprising a plate-holder carriage adjustable transversely to a beam of rays, said carriage being provided with two face sections impervious to X-rays and spaced apart leaving an intervening space which is pervious to X-rays, a plate-holder frame mounted by means of link mechanism upon said carriage in rear of said face sections and having a pendulous movement transversely of said carriage to successively expose a plurality of sensitive plates through the space intermediate of said impervious sections, mechanism to latch and release said plate-holder frame relative to said carriage, a plurality of plate-holders carried in substantially one plane by said plate-holder frame, an X-ray generating member located in front of said plate-holder carriage, mechanism to adjust said X-ray generating member a predetermined distance transversely to the face of said plate-holder carriage in the interval between successive exposures of sensitive plates carried by said plate-holder frame, and actuating means operatively connected to said plate-holder frame and X-ray generator and manually initiated to cyclically energize said generator, release and latch said plate-holder frame, and again energize said generator in its second position.

44. A photographic apparatus comprising in combination with a source of radiant energy, a plate-holder carriage across the path of said radiant energy, a plate-holder frame pendulously mounted upon said plate-holder carriage and movable relative to said carriage transversely to the direction of propagation of said radiant energy, means to release said plate-holder frame from one position of adjustment relative to said carriage, and means to lock said plate-holder frame to a new position of adjustment relative to said carriage.

45. A photographic apparatus comprising in combination with a source of radiant energy, a plate holder supporting member, a plurality of plate holders pendulously supported with reference to said supporting member and pendulously movable to different positions relative to said supporting member to enable sensitive plates carried by said plate-holders to be successively exposed to the action of said radiant energy, means to release said plate-holders from one fixed position, and means to lock said plate-holders after a period of movement to another fixed position.

46. Photographic apparatus comprising in combination with a source of radiant energy, a plate-holder supporting member, a plurality of plate-holders pendulously supported with reference to said supporting member, a pair of plate-members spaced apart and stationarily mounted with reference to said plate-holder supporting member and impervious to said radiant energy, a plate-member hinged with reference to said plate-holder supporting member and adapted to bridge the gap between said impervious plate-members and to constitute a spacing support for a subject to be photographed, said intermediate plate-member being pervious to said radiant energy and serving as a gate through which to remove and replace the plate-holders and sensitive plates.

47. Photographic apparatus comprising in combination with a source of radiant energy, a plate-holder supporting member, a plurality of plate holders supported and movable with reference to said supporting member transversely of the direction of propagation of said radiant energy, a pair of members impervious to said radiant energy spaced apart and in position to protect one or other of the sensitive plates in said plate-holders against exposure to the action of said radiant energy, and a member pervious to said radiant energy bridging the space between said impervious members and through which intervening space the sensitive plates carried by said plate-holders are adapted to be successively exposed to the action of said radiant energy.

48. Photographic apparatus comprising in combination with a source of radiant energy, a plate-holder supporting member, a plurality of plate-holders supported and movable with reference to said supporting member transversely of the direction of propagation of said radiant energy, a pair of members spaced apart and impervious to said radiant energy in position to protect one or other of the sensitive plates in said plate-holders against exposure to the action of said radiant energy, and a door member pervious to said radiant energy bridging the space intermediate of said impervious members and through which the sensitive plates carried by said plate-holder are adapted to be successively exposed to the action of said radiant energy, and through which said plate-holders and sensitive plates are adapted to be removed and replaced.

49. Photographic apparatus comprising in combination with a source of radiant energy, a plate-holder carriage adjustable in one direction transversely of the direction of propagation of said radiant energy, said carriage being provided with two sections spaced apart and impervious to said radiant energy and a section pervious to said radiant energy located intermediate of said impervious sections, a plurality of plate-holders movable transversely to the direction of propagation of said radiant energy, said impervious sections being adapted in one position of the plate holders to shield a first plate holder and its sensitive plate in rear of one of said impervious sections while exposing a second plate holder and its sensitive plate to said radiant energy in rear of said intermediate pervious section, and in a second position to shield the exposed sensitive plate in the second plate holder in rear of the opposite impervious section and to expose the unexposed plate in said first plate holder in rear of said pervious section, and mechanism operable to release said plate holders from one position and to latch them in another position.

50. Radiographic apparatus comprising in combination with a source of radiant energy and a shield impervious to X-rays, a plate holder pendulously supported with reference to said shield, and means operable automatically to latch said plate holder respectively at opposite limits of its pendulous movement.

51. Radiographic apparatus comprising in combination with a source of X-ray energy, a shield impervious to X-rays, a plate holder supported to move pendulously relative to said shield, means to release said plate holder from a position of rest at substantially one extremity of its pendulous movement, and means operable to latch said plate holder at substantially the opposite limit of its pendulous movement.

52. Radiographic apparatus comprising in combination with a source of X-ray energy, a shield impervious to X-rays, a plate holder supported to move pendulously relative to said shield to alternately expose and shield a sensitive plate, means to release said plate holder from a position of rest at substantially one limit of its pendulous movement, and means operable automatically to latch said plate holder at the opposite limit of its pendulous movement.

53. Radiographic apparatus comprising in combination with a source of X-ray energy, a pair of shields spaced apart and impervious to X-rays, a plate holder supported to move pendulously relative to said shields to alternately expose and shield sensitive plates carried by said plate holder, means to release said plate holder from a position of rest respectively near opposite limits of its pendulous movement, means operable automatically to latch said plate holder respectively near opposite limits of its pendulous movement, and auxiliary plate holder energizing means applicable alternately in opposite directions to assist the pendulous movement of said plate holder.

In testimony whereof I have affixed my signature.

JOHN ROBERT KELLEY.